June 2, 1959
W. RAMBOW
2,889,177
LEG SUPPORTED STRUCTURE
Filed Oct. 17, 1956
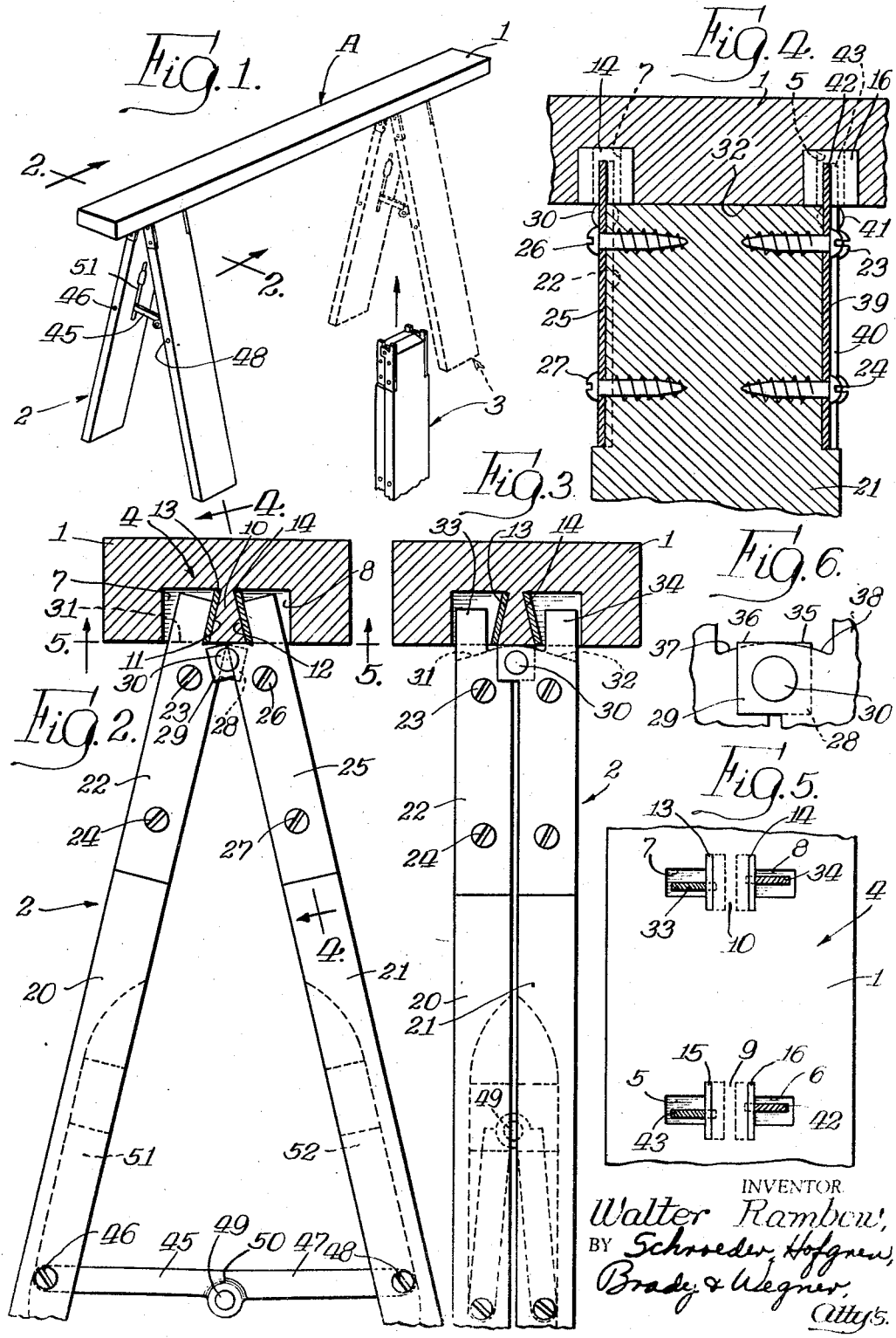
INVENTOR.
Walter Rambow,
BY Schroeder, Hofgren,
Brady & Wegner,
Attys.

United States Patent Office 2,889,177
Patented June 2, 1959

2,889,177

LEG SUPPORTED STRUCTURE

Walter Rambow, Chicago, Ill.

Application October 17, 1956, Serial No. 616,467

4 Claims. (Cl. 304—5)

This invention relates to a leg supported structure and more particularly to such a structure in which the legs may be readily attached and detached.

An object of this invention is to provide a new and improved leg supported structure in which the legs may be readily attached or detached without the use of any tools and which results in a substantial, sturdy structure when the legs are attached.

A further object of this invention is to provide a leg supported structure having an elongated member and supported legs easily attached or detached to said member without the use of tools comprising, when the member and legs are assembled, interengaging parts on the legs and member supporting the member on the legs, and means defining interengaging clamp surfaces on the legs and member which are tightly engaged as the legs are moved to supporting position.

A further object of this invention is to provide a leg supported structure in which an elongated member has spaced apart leg attaching structures, each of which includes two pairs of recesses with each pair spaced transversely of the member with a section of the member therebetween, said bar section having its sides common to said recesses tapered toward its base with a clamp plate placed against each of said sides, a leg structure including a pair of legs with a hinge at each side of the legs and at one of their ends, each hinge having a pair of leaves with one attached to each leg, and a reduced extension extending beyond the leg end and forming a clamp member, and means for maintaining the legs in spaced apart relation and at an angle to each other so as to have the clamp members extended within and abutting the clamp plates so as to securely attach the legs to said member.

The objects of the invention generally set forth together with other ancillary advantages are attained by the construction and arrangement shown by way of illustration in the accompanying drawing, in which:

Fig. 1 is a perspective view of the leg supported structure with one of the two leg structures shown in position for attachment and in broken line shown attached;

Fig. 2 is a vertical section taken through the structure along the line 2—2 in Fig. 1 with a pair of legs shown in elevation;

Fig. 3 is a view similar to Fig. 2 but showing a pair of legs after insertion but before attachment to an elongated main bar;

Fig. 4 is a fragmentary section in elevation taken along the line 4—4 in Fig. 2;

Fig. 5 is a fragmentary plan section taken looking upwardly generally along the line 5—5 in Fig. 2; and Fig. 6 is a fragmentary enlarged view of the hinge ears.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

The leg supported structure may be utilized for many different purposes and merely for the purpose of description such structure may form a sawhorse-type device, as indicated generally at A in Fig. 1, although the principles of this invention are equally applicable to tables, highway safety barricades, and the like.

The structure A comprises a member to be supported, such as an elongated bar 1, which, as shown, may be made of wood or the like. The member 1 is supported by a pair of leg structures, indicated generally at 2 and 3, respectively. The member 1 has spaced apart, leg attaching structures associated one with each of the leg structures 2 and 3, respectively, and one of these for leg structure 2 is shown in detail in Figs. 2 to 6, the other leg attaching structure being of the same construction and spaced along the member 1 in a position desired for attaching the other leg structure 3.

One of the leg attaching structures, indicated generally at 4, includes a first pair of transversely spaced recesses 5 and 6 and a second pair of transversely spaced recesses 7 and 8 spaced from the first pair of recesses. These recesses are defined by sides thereof formed from the member 1. Each of the transversely spaced pair of recesses has a section of the member formed therebetween, as indicated at 9 and 10, and each of the member sections has its sides common to the recesses inclined toward the base of the section to form a tapered member section. As shown in Figs. 2 and 3, the member section 10 has a side 11 common to the recess 7 and a side 12 common to the recess 8. The sides 11 and 12 are inclined so as to have the member section 10 thinner at its base than at its free end. A metal clamp plate 13 is placed over the side 11, and a metal clamp plate 14 is placed over the side 12, and these plates are of a length sufficient to extend beyond the recesses 7 and 8 so as to have their ends securely embedded in member 1. As shown in Fig. 5, a pair of clamp plates 15 and 16, comparable to plates 13 and 14, are associated with the recesses 5 and 6.

The leg structures 2 and 3 are identical and therefore interchangeable, and thus the description of one leg structure will apply equally well to the other leg structure. The leg structure 2 comprises a pair of legs 20 and 21 which have a hinge mechanism on each side at one of their ends. A first hinge has a leaf 22 secured to the upper end of the leg 20 and secured thereto by suitable means, such as screws 23 and 24. Another leaf 25 of the hinge is secured to an end of leg 21 by screws 26 and 27, and the legs 20 and 21 may be recessed different amounts so that the hinge leaves 22 and 25 will be offset from each other to permit a pair of pivot ears 28 and 29 on the hinge leaves 22 and 25, respectively, to lie alongside each other and be pivotally interconnected by a connecting pin, such as rivet 30.

The legs 20 and 21 have their upper ends beveled, as shown at 31 and 32, and the hinge leaves 22 and 25 have reduced extensions 33 and 34, respectively, which extend beyond the ends 31 and 32 of the legs. The hinge leaf extensions 33 and 34 constitute clamp members and extend in a direction paralleling the length of the legs and are spaced apart, when the legs are closed, a distance sufficient to permit the insertion thereof into the recesses 7 and 8 of the member 1, as shown in Fig. 3. As the legs 20 and 21 are moved apart to their spaced supporting position, the clamp members 33 and 34 are brought tightly against the clamp plates 11 and 12 to securely attach the leg structure 2 to the member 1. The member 1 is strongly supported by having its underside rest on the beveled ends 31 and 32 of the legs 20 and 21, respectively, and the member section 10 rests on the hinge leaf ears 28 and 29, both of which may have their upper edges formed with flats 35 and 36 (Fig. 6), respectively, which engage the member section 10 when the leg structure is inserted and sections 37 and 38, respectively, flush with the beveled ends 31 and 32 of the legs engageable with the member section 10 when the legs are spread apart.

The other hinge fastened to an end of the legs 20 and 21 comprises a hinge leaf 39 and a hinge leaf 40 pivotally interconnected by a pin 41. The hinge leaf 39 has an extension 42 forming a clamp member engageable with the clamp plate 16, and the hinge leaf 40 has an extension 43 forming a clamp member which may engage the clamp plate 50.

Means for maintaining the legs in spaced apart relation and at an angle to each other comprises a toggle linkage having a link 45 pivotally connected to the leg 20, as indicated at 46, and a link 47 pivotally connected to the leg 21, as shown at 48. The links 45 and 47 are connected by an off-center pin 49 so that with the legs 20 and 21 extended the links 45 and 47 are moved to an over-center position and abutting at 50 so as to maintain the legs spread apart. The legs 20 and 21 are recessed, as indicated at 51 and 52, respectively, so as to permit entry of the toggle linkage therein when the legs are positioned adjacent each other, as shown in Fig. 3. The leg structure 3 and associated structure in the member 1 are identical with that shown in Figs. 2 to 6. It is believed that the manner of assembly of the leg supported structure is obvious from the foregoing; however, it may be stated that the leg structure 2 is held with the legs next to each other, and the clamp member extensions 33, 34, 42, and 43 of leg structure 2 are inserted within the recesses in member 1, this movement being limited by the flats 35 and 36 on the hinge ears. The legs 20 and 21 are then spread apart by pivotal movement about the pins 30 and 41 to cause the clamp members to tightly engage the clamp plates 13, 14, 15, and 16, and this relationship is maintained by the toggle linkage having links 45 and 47, which is the position shown in Fig. 2, and in which the member 1 rests upon the beveled ends 31 and 32 of the legs. The leg structure 3 would be similarly attached.

I claim:

1. A device of the sawhorse type comprising, in combination, an elongated main bar having spaced apart, leg attaching structures, each of said structures including means defining two pairs of recesses with each pair spaced transversely of the bar with a section of the bar therebetween, said bar section having its sides common to said recesses tapered toward its base, and a clamp plate placed against each of said tapered sides with its ends embedded in said bar, a pair of leg structures each including a pair of legs, means pivotally connecting the legs including a hinge at each side of the legs at one of their ends, each hinge having a pair of leaves with one attached to each leg, a reduced extension on each hinge leaf extending beyond a leg in a direction parallel to a leg and forming a clamp member, each leg having its upper end beveled, and means for maintaining the legs in spaced apart relation and at an angle to each other so as to have the clamp members parallel to and abutting the clamp plates when in said recesses with the beveled ends of the legs abutting the underside of the main bar.

2. A leg supported structure comprising, in combination, an elongated main bar having spaced apart, leg attaching structures, each of said structures including means defining two pairs of recesses with each pair spaced transversely of the bar with a section of the bar therebetween, said bar section having its sides common to said recesses tapered toward its base, and a clamp plate placed against each of said tapered sides, a pair of leg structures each including a pair of legs, hinge means pivotally connecting the legs, a clamp member associated with each leg and extending beyond a leg in a direction parallel to a leg, said legs having a first position wherein the clamp members may be inserted in the recesses, and means for maintaining the legs in spaced apart relation and at an angle to each other so as to have the clamp members parallel to and abutting the clamp plates when in said recesses.

3. Leg attachment mechanism for detachably fastening legs to a member to be supported having a pair of supporting leg structures each comprising a pair of legs comprising, a hinge on each side of a leg pair including a hinge leaf secured to each leg with an ear for receiving a connecting pivoting pin, a reduced extension of each hinge leaf beyond a leg forming a clamp member, means defining recesses in the member to be supported for receiving said clamp members, inclined clamp plates in said recesses arranged to extend parallel and in tight engagement with said clamp members as the legs are moved to extended supporting positions, and means for maintaining the legs in their extended supporting positions.

4. Leg attachment mechanism for detachably fastening legs to a member to be supported having a pair of supporting leg structures each comprising a pair of legs comprising, a hinge on each side of a leg pair including a hinge leaf secured to each leg, a reduced extension of each hinge leaf beyond a leg forming a clamp member, means defining recesses in the member to be supported for receiving said clamp members when the legs of a pair are in a first insertion position, and inclined clamp plates in said recesses arranged to extend parallel and in tight engagement with said clamp members as the legs are moved to extended supporting positions.

References Cited in the file of this patent

UNITED STATES PATENTS

| | | |
|---|---|---|
| 1,174,964 | Bradley | Mar. 14, 1916 |
| 1,261,007 | Beardsley | Apr. 2, 1918 |
| 1,749,190 | McGregor | Mar. 4, 1930 |
| 2,561,864 | Hollywood | July 24, 1951 |
| 2,689,154 | Redler | Sept. 14, 1954 |